United States Patent [19]

Lavigne

[11] 4,237,479

[45] Dec. 2, 1980

[54] BLANKING VOLTAGE GENERATOR FOR A CATHODE RAY TUBE

[75] Inventor: André Lavigne, Montrouge, France

[73] Assignee: Videocolor S.A., Montrouge, France

[21] Appl. No.: 21,251

[22] Filed: Mar. 16, 1979

[30] Foreign Application Priority Data

Mar. 16, 1978 [FR] France .................................. 78 07703
Jun. 5, 1978 [FR] France .................................. 78 16770

[51] Int. Cl.³ ................................................ H04N 9/16
[52] U.S. Cl. .................................... 358/33; 358/165; 358/243
[58] Field of Search .................. 358/74, 243, 33, 165

[56] References Cited

U.S. PATENT DOCUMENTS 4,014,038   3/1977   Hwang et al. ..................... 358/33 X

*Primary Examiner*—Robert L. Richardson
*Attorney, Agent, or Firm*—Gajarsa, Liss & Conroy

[57] ABSTRACT

Apparatus is disclosed for generating a blanking voltage for electron guns in cathode ray tubes, as used, for example, in color television displays. Apparatus utilizes circuitry including a video voltage amplifier having a control input. A feedback loop, connected between the junction of the cathode and video voltage amplifier output at one terminal, and the control input at the other, modifies the blanking voltage in response to samples of the cathode current taken when the video signal is zero.

13 Claims, 4 Drawing Figures

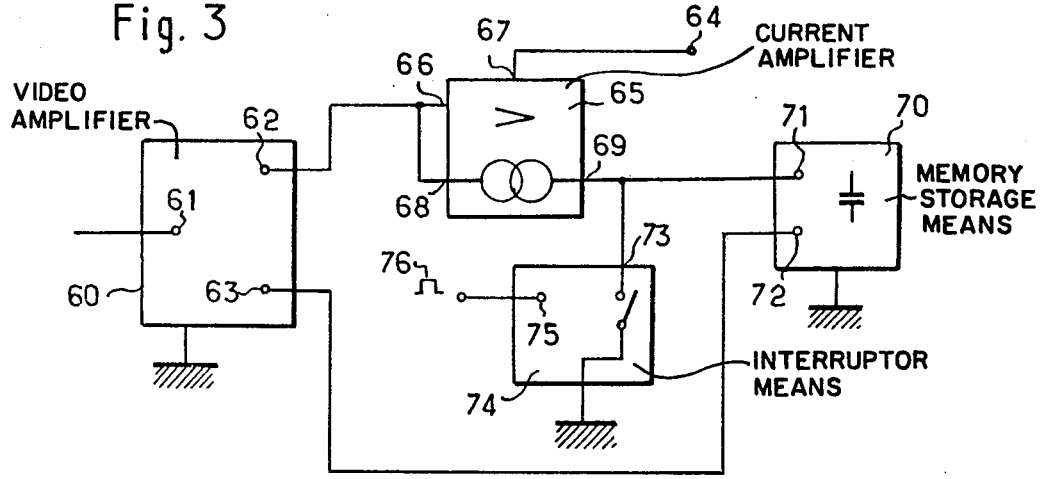
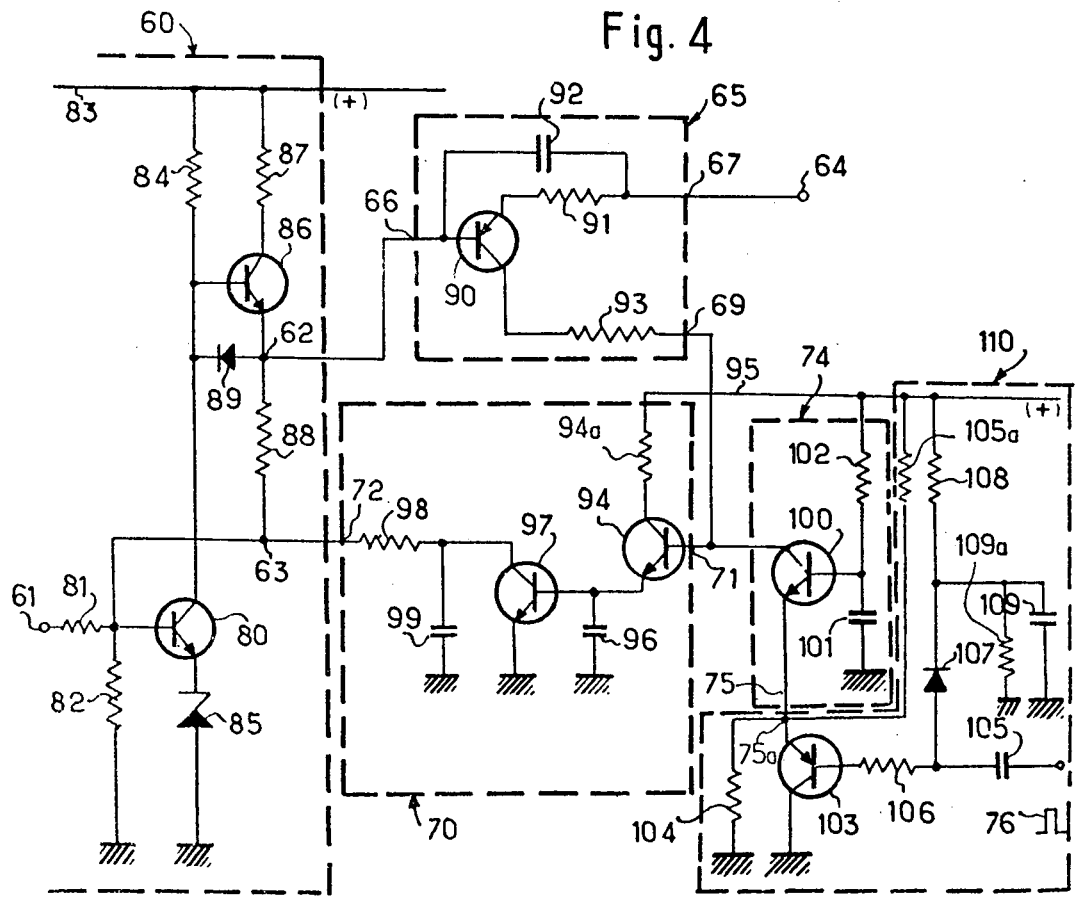

BLANKING VOLTAGE GENERATOR FOR A CATHODE RAY TUBE

BACKGROUND OF THE INVENTION

The present invention relates to a device for the generation of a blanking voltage for a cathode ray tube, and more particularly for generation of such a blanking voltage for a color television or display.

It is well-known that a television receiver comprises a cathode ray tube in which one or more electron guns are disposed. Electrons are beamed from the guns onto a screen composed of phosphors responsive to electron bombardment, and on which visual displays are thus created when the electron beam(s) scan(s) the screen. This scanning is effected along essentially parallel lines on the screen. The light intensity at each point scanned on the screen depends on the intensity of the electron beam; more precisely, if the intensity of the electron beam is equal to zero the display is black; when this intensity exceeds a certain level the display is white (in the case of black-and-white television).

The intensity of the electron beam generated by the gun of a television tube depends on the potential or voltage of the gun's various electrodes. In order to vary the intensity of the electron beam and, thus, the light intensity at each point scanned, it is generally the potential of only one electrode that is made to vary in the gun, most frequently that of the cathode, the potential of the other electrodes then remaining constant. The potential applied to this electrode presents a steady-value component on which is superimposed a component whose amplitude varies as a function of the intensity of the image to be reproduced. The variable potential is called the video voltage signal. The constant-value component is called the "blanking voltage" in the present description and makes it possible to produce a black display bordering on gray when the video signal is equal to zero. It should be stressed at this point that this constant-value component is a continuous component which must not be confused with the mean value of the video signal which is also frequently called "continuous component."

The blanking voltage must be equal to the extinction voltage of the tube and has a well-defined value: the precise value needed for a blank display. If the blanking voltage is not at that precise level, the display will be too light or too dark. For example, if the video signal is applied to the cathode and if the blanking voltage has a high positive value, the display will be permanently blank.

It is well-known that the value of the extinction voltage can be altered by several causes, in particular the aging of the television tube. In addition, the devices used for the generation of the blanking voltage can be subject to drift. If the blanking voltage is not modified in accordance with the changes in the extinction voltage and in accordance with said drift, the display will be affected, the latter then being, as stated above, either too bright or too dark; and in the case of color television it is the color that would be affected. That is why television receivers are generally equipped with devices that make it possible to vary the blanking voltage.

In black-and-white television receivers, this correction is the one called "brightness control" and it is performed manually, for example by turning the control knob of a potentiometer.

Color television receivers comprise three electron guns and in their case three blanking voltages must be generated. However, these blanking voltages can all vary by the same amount; this is a "common mode" variation and the correction for this variation can be performed manually by means of a "brightness control" knob, just as in the black-and-white television receivers. These variations may also be of a differential type, however. I.e., the variations may not be of identical value for the three guns. Such differential variation, in actual practice, cannot be corrected manually.

BRIEF DESCRIPTION OF THE PRIOR ART

A device for generating the blanking voltage for a color television tube is known which makes it possible to obtain the correct value of this blanking voltage for each of the electron guns at any given moment. In this apparatus devices are provided to measure the intensity of the cathode current (i.e., the intensity of the electron beam) during line scanning, in the course of which a zero-value is imposed on the video signal. The result of this measurement is used in order to impose on the blanking voltage, applied to so-called "$G_1$" grids in the tube, the threshold value for which the intensity of the cathode current is equal to zero when there is zero video signal. Now, in most television receivers, particularly those for color reception, the video signal is applied to the cathodes of the three electron guns. The use of such a device thus requires significant modifications in the television receivers; in particular, it is necessary to provide a feed of non-customary polarity, and all the cathodes of the electron guns in a receiver equipped with this device are raised to the same potential; consequently, the guns have a feeble slope.

Another familiar solution for imposing the correct value to the blanking voltage consists in stabilizing the potentials applied to all the electrodes of the electron gun(s). It has been demonstrated, however, that this solution is not satisfactory after prolonged use of the tube.

Still another well-known system is known for automatic compensation of the cut-off current, applicable especially to cathode tubes where the video modulation is applied to the cathodes.

The operation of this device is summarized as follows: at each raster flyback the cut-off correction is always composed of a preparation phase and a measurement and adjustment phase. The preparation phase permits isolation of the modulation, or its "disconnection". This phase is required in such a system in order to suppress the modulation component and to allow the circuits to stabilize in this state. Consequently, at the end of this preparation phase, only the cut-off voltage source is connected to the cathode. An integrated circuit makes it possible to "memorize" the value of this cut-off voltage source at the end of the preparation phase, until the next measurement is made. Then, during the measurement and adjustment phase, this memorized voltage is used to modify accordingly the bias in the video amplifier, in order always to return to the cut-off point during the next normal scanning interval when the video modulation is again connected to the cathode. Thus, the basic concept developed in this prior art consists in defining a testing procedure which entails a particular treatment of the signals transmitted to the cathodes during the raster flyback. In consequence, the drawback is that two pulses must be generated during the raster flyback interval, a preparation pulse whose function is to "disconnect" the video, and a pulse initiating the actual testing.

SUMMARY OF THE INVENTION

Accordingly, the object of the present invention is to obviate the drawbacks listed above, and especially to provide a device for the generation of blanking voltage for television receivers, particularly those for color reception, which is capable of generating such a blanking voltage automatically without need for manual adjustment, and which is readily adaptable, at little cost, to most of the television receivers now being produced.

The present invention comprises devices that are sensitive to the intensity of the cathode current during sampling periods when the video signal is equal to zero. Regulating devices are used to modify the blanking voltage as a function of this intensity, so as to cancel out the latter when there is zero video signal. Accordingly, the invention is characterized by a video voltage and blanking voltage signals applied to the cathode of the electron gun(s) in the tube by means of a video voltage amplifier, and comprises a feedback loop inserted between the connection joining the output of said video voltage amplifier to the corresponding cathode and a control input in said video voltage amplifier, for the control of the blanking voltage. The feedback loop comprises a current amplifier designed to increase the cathode current and having a high output impedance in relation to the output impedance of the video voltage amplifier, the input circuit of said current amplifier being joined with said connection. Memory storage devices are provided whose input is connected to the output of said current amplifier and whose output is connected to said control input.

The video amplifier is so designed that there appears at its output, so as to be superimposed on the amplified video signal, a continuous voltage (superimposed on the increased video signal) of definite value. If the signal applied to the control input corresponds to an intensity of the cathode current that is not equal to zero, the corresponding continuous voltage at the output of the video amplifier increases in value; and since an increase in the voltage applied to the cathode causes a drop in the intensity of the cathode current, the object of the desired control is achieved.

The preferred embodiment of the invention comprises a cathode current amplifier featuring a high output impedance in relation to the output impedance of the video amplifier. The output of the current amplifier is connected to the input of the memory storage devices. The group is wired in such a manner that the cathode current entering into the current amplifier is led to ground by means of the input stage of the current amplifier and of the low-impedance output of the video amplifier. Moreover, the amplified current output at the high-impedance terminal of the current amplifier returns to the amplifier by passing through the low-impedance output of the video amplifier.

As described in the specification, with such wiring, which is particularly simple, the variations in the video voltage signal proper (i.e., not comprising the continuous blanking voltage component) and those in the intensity of the cathode current during the sampling periods, have no effect on one another.

Preferably, in this latter embodiment, in order to store in memory only the cathode current during the sampling periods, interruption devices are provided to short-circuit the input of the current amplifier outside these sampling periods. If these sampling periods are the scanning flyback intervals, in order to control the operation of these interruptor devices, voltage pulses are preferably used that are generated during the normal scanning. In order for these pulses not to affect the video voltage signal, they are converted into current pulses by means of a converter featuring an output impedance that is high in relation to the output impedance of the video amplifier. The control current pulses are led back to the ground means of the low impedance output of the video amplifier.

In the case of a television receiver (or more generally of a display device) for color transmission that comprises three electron tubes, a device in accordance with the invention is provided, regardless of its particular embodiment, for each electron gun.

In one embodiment, the interruptor devices can be wired so as to short-circuit the input memory storage devices outside the sampling period.

Since these interruptor devices are thus insulated from the cathode, the voltage pulses used for their control are in no danger of affecting the video signal; the control circuit for these interruptor devices can therefore be particularly simple.

These and other objects, features, and advantages of the present invention will become more readily apparent from the following specification and appended claims, when considered in conjunction with the attached drawings.

BRIEF DESCRIPTION OF THE DRAWINGS

FIG. 3 presents in block form a variant of the device of the invention; and

FIG. 4 represents a particular embodiment of the device shown in FIG. 3.

DETAILED DESCRIPTION OF THE INVENTION

Figure 1:
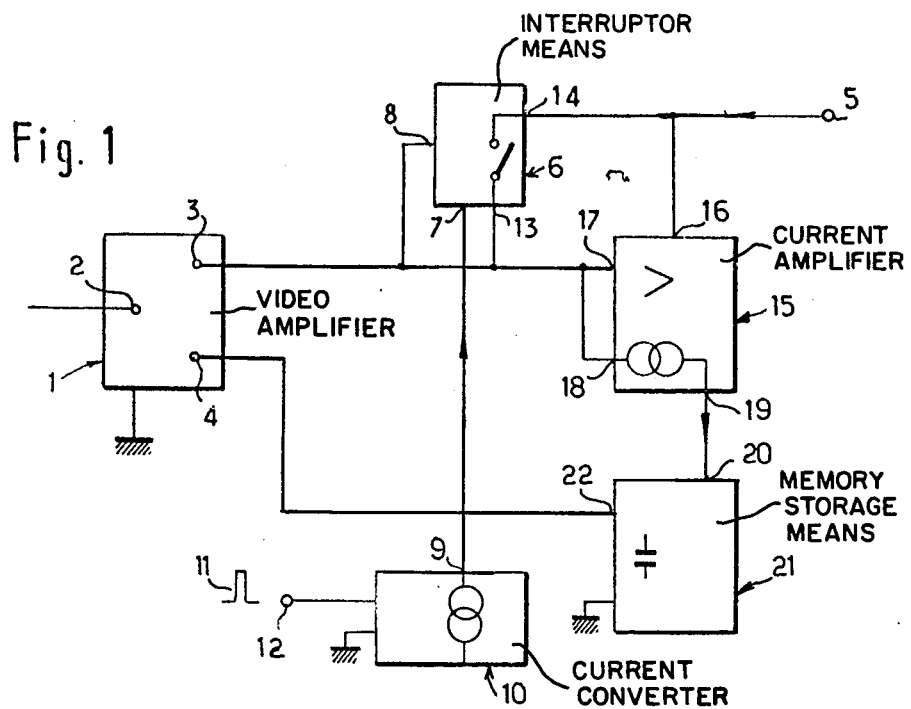
FIG. 1 presents in block form a device in accordance with the invention.

The device shown in FIG. 1 comprises a familiar type of video amplifier, presenting an input terminal 2 for the video voltage signal and an output 3 for this same signal. This amplifier 1 also presents a control or feedback input 4 which, in prior devices, was connected to a steady signal source in order to apply to the continuous voltage that is superimposed on the video signal from terminal 3 a value equal to the extinction voltage of the corresponding electron gun (not shown). Furthermore, in the example, the continuous voltage output at terminal 3 varies in the same direction as the continuous signal applied to input 4. But, as will be shown below, feedback input 4 (sometimes called the control input) is not connected to the output of a steady-value signal source, but to the output of a circuit producing a signal representative of the cathode current during scanning flyback.

Output 3 is connected to cathode 5 of the corresponding gun by means of an interruptor device 6.

Interruptor device 6 is constituted by a four terminal network with two input terminals 7 and 8. Input 8 is connected to output 3 of amplifier 1. Input 7 of this four terminal network is connected to output 9 of another four terminal network 10 whose function is to transform into current pulses the voltage pulses 11 applied to its inputs. Four terminal network 10 comprises a first input terminal 12, and its second input terminal is constituted grounded. The second output terminal of this four terminal network is also grounded.

Pulses 11 are produced by a generator (not shown) that is part of the standard components of a television receiver. Pulses 11 are synchronous with back and forth line scanning.

The output impedance of four terminal network 10, i.e., the impedance of terminal 9, is considerable, so that this four terminal network operates as a current generator.

Four terminal network 6 features two output terminals 13 and 14 that are connected to output 3 of amplifier 1 and to cathode 5, respectively.

The device represented in FIG. 1 further comprises a current amplifier 15 designed to increase the cathode current. This amplifier 15 is constituted by a four terminal network with two input terminals 16 and 17. Input 16 is connected directly to cathode 5 and input 17 is connected to output 3 of amplifier 1. Output terminals 18 and 19 of this four terminal network 15 are connected to terminal 3 and to input 20 of circuit 21, respectively. Circuit 21 performs the function of converting the current applied to its input 20 into a voltage, storing this voltage in memory and converting this voltage thus stored into current. Thus a current signal occurs at output 22 of circuit 21.

Circuit 21 constitutes a four terminal network whose input terminals are constituted by terminal 20 and the ground. One of the output terminals 22 is connected to control input 4 of video amplifier 1. The second output terminal of four terminal network 21 is also grounded.

Current amplifier 15 presents a high impedance between its output terminals 18 and 19 so as to constitute, between these terminals, a current generator.

The device operates as follows:

During direct line scanning, interruptor 6 is closed and input terminals 16 and 17 of amplifier 15 are thus short-circuited; no current is then generated by amplifier 15 between terminal 19 and input 20 of circuit 21.

The operation of device 6 is controlled by voltage-current converter 10.

The current pulses applied to output 9, with its high impedance, of device 10 follow the following circuit: terminal 7—device 6—output 8—terminal 3 (of low impedance)—ground. Inasmuch as amplifier 1 presents a low impedance at its output 3, this current does not affect the voltage in this terminal 3. Conversely, the current produced at output 9 is not modified by voltage variations at terminal 3.

During line and raster scanning flyback, interruptor device 6 is open and the cathode current enters amplifier 15 by means of terminals 16 and 17. Output terminal 19 then delivers a current signal representing an amplification of the cathode current.

The cathode current follows the following route: cathode 5, input 16, input amplifier stage 15, terminal 17, amplifier terminal 3, ground.

The circuit for the output current of amplifier 15 is the following: terminal 19, terminal 20, circuit 21, ground, terminal 3 of amplifier 1 and terminal 18 of amplifier 15.

This output current of amplifier 15, similarly to the current generated by circuit 10, flows through terminal 3 but does not affect the voltage signal delivered at this terminal, between terminals 18 and 19, since amplifier 15 presents a high impedance and amplifier 1 presents a low impedance at its terminal 3. For the same reason, the voltage variations in the video signal do not affect the current output by amplifier 15.

The current signal output by terminal 19 of amplifier 15 must be as weak as possible in order to achieve extinction of the tube during scanning flyback.

It is converted into voltage by circuit 21 and stored by the latter in order, finally, after having been reconverted into current, to be applied to control input 4 so as to confer the desired value to the continuous voltage component delivered at output 3 by video amplifier 1.

Indeed, when the current applied to input 4 is of zero intensity, there occurs at output 3 a continuous voltage of constant level Vext which is added to the video voltage signal. If the intensity of the cathode current is not zero during scanning flyback, the intensity of the current applied to input 4 is not zero either, and the result is that the continuous voltage at terminal 3 has a value that is greater than Vext. Since this is a potential applied to a cathode, its increase causes a reduction in the intensity of the cathode current. Thus the desired control effect is achieved, i.e., the entire increase in the intensity of the cathode current during scanning flyback is compensated by a variation in the continuous voltage that is superimposed on the video voltage signal so as to bring the value of this continuous voltage back to that of the extinction voltage.

It will be appreciated that such a device will always insure the appropriate value for the blanking voltage without significantly modifying the television receiving apparatus.

It should be noted that it is not indispensable for the signal applied to terminal 4 to vary in the same direction as the continuous voltage delivered at output 3 of amplifier 1. It is sufficient for a variation in this signal that corresponds to an increase in the intensity of the cathode current, to produce an increase in the continuous voltage at output 3 so as to reduce said intensity of the cathode current.

Figure 2:
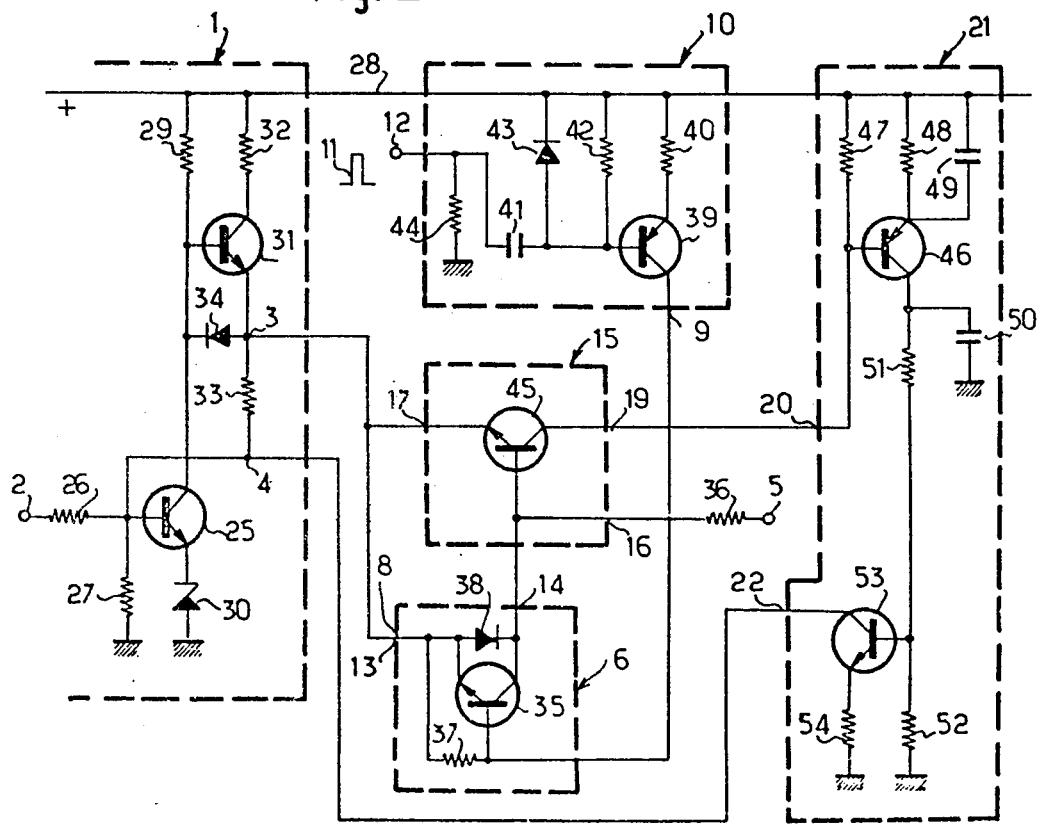
FIG. 2 represents a particular embodiment of the device shown in FIG. 1.

In the diagram of FIG. 2 those elements that are of the same nature, i.e., that fulfill the same function, as those in FIG. 1, have been labeled with identical reference numbers.

In this example, the familiar amplifier 1 is of the "active load" type. It is well known that such an amplifier presents a weak output impedance while consuming only small amounts of current.

Amplifier 1 comprises a transistor 25 of the N-P-N type whose base is connected to input terminal 2 by means of a resistor 26. Additionally, the base of transistor 25 is grounded by means of a resistor 27 and is also connected to control terminal 4. The collector of transistor 25 is connected to a line 28 that is raised to a positive potential of considerable level by means of a resistor 29 having a high value. The emitter of transistor 25 is grounded by means of a Zener diode 30 having a grounded anode.

Transistor 25 is wired as an amplifier with a common-emitter connection; such a circuit presents a high output impedance. In order to reduce this impedance the amplifier is supplemented by an emitter follower circuit comprising a transistor 31, also of the N-P-N type. The base of transistor 31 is connected to the collector of transistor 25, while the emitter of transistor 31 is connected to terminal 3 and the collector is connected to line 28 by means of a resistor 32.

Finally, for amplifier 1, a feedback resistor 33 is disposed between terminals 3 and 4 and a diode 34 provides connection between terminal 3 and the collector and base of transistors 25 and 31, respectively. Diode 34 is wired such that its anode is connected to terminal 3.

Interruptor device 6 comprises a transistor 35 of the N-P-N type whose emitter is connected directly to terminal 3 and thus constitutes output 13 and input 8. The collector of this transistor 35 is connected to cathode 5 by means of a resistor 36. A resistor 37 is disposed between the base and the emitter of this transistor. Finally, a diode 38 is connected in parallel with the emitter and collector of transistor 35, so that its anode is connected directly to the latter's emitter.

The converter 10 of voltage pulses into current pulses comprises a transistor 39 of the P-N-P type whose collector is connected to the base of transistor 35 and whose emitter is connected to line 28 by means of a resistor 40.

The base of transistor 39 is connected to terminal 12 to which are applied pulses 11, which block the transistor during scanning flyback by means of a capacitor 41. This base of transistor 39 is also connected to line 28 by means of parallel wiring of a resistor 42 and a diode 43 whose cathode is connected directly to line 28.

Finally, a resistor 44 is disposed between terminal 12 and ground.

Amplifier 15 is constituted by a transistor 45 of the N-P-N type. The base of this transistor 45 is connected to cathode 5 by means of resistor 36 and is thus connected directly to the collector of transistor 35. The emitter of transistor 45 is connected to output 3 of amplifier 1.

Circuit 21 comprises a transistor 46 of the P-N-P type whose base is connected to terminal 20, i.e., to the collector of transistor 45. This base of transistor 46 is also connected to line 28 by means of a resistor 47. Between the emitter of transistor 46 and line 28, a resistor 48 and a capacitor 49 are wired in parallel. The collector of transistor 46 is grounded by means of another capacitor 50 and by means of two resistors 51 and 52 wired in series.

The terminal common to resistors 51 and 52 is connected to the base of transistor 53 of the P-N-P type whose emitter is grounded by means of resistor 54 and whose collector is connected to control input 4 of video amplifier 1 and thus constitutes output terminal 22 of circuit 21.

The operation of the device shown in FIG. 2 is the same as that of the device represented in FIG. 1. However, the following points need to be made:

Diode 34, between terminal 3 and the collector of transistor 25 makes it possible to insure the discharge of the capacitor formed by the tube during the transient pulses of negative polarity.

The capacitor groups and resistor labeled 49 and 48, on the one hand, and those marked 50 and 51, on the other hand, permit the transformation into voltage, storage and integration of the current signal occurring at output 19 of amplifier 15.

The wiring of transistor 53 and resistors 52 and 54 make it possible to reconvert into current the voltage signal stored in said capacitor groups 49 and 50.

When the intensity of the cathode current is not zero, the resistance between the collector and emitter of transistor 53 decreases, which causes an increase in the current flowing from terminal 4 of amplifier 1 to terminal 22 of circuit 21, the potential at this terminal being dictated by that of Zener diode 30 and by voltage $V_{BE}$ (base emitter) of transistor 25. This increase in current intensity is then compensated by a current surge through resistor 33. Under these conditions, the potential at terminal 3 is increased, which is the purpose of the control.

The pulses 11, after being converted into current pulses, make it possible to block transistor 39 during scanning flyback (lines and raster). When transistor 39 is blocked, the base of transistor 35 in interruptor 6 is then "in the air" and this latter transistor, itself, is blocked. On the contrary, during normal scanning, transistor 39 is saturated and the same applies to transistor 35; the latter then short-circuits the emitter base junction of transistor 45.

Diode 38 and the emitter collector portion of transistor 35 insure the discharge of the tube capacitors. Diode 38 fulfills this function, especially during the occurence of the transient pulses in the video signal.

Diode 43 and resistor 42 of converter 10 insure the reliable operation of the latter. Indeed, these elements make it possible to block transistor 39 permanently in the permanent absence of pulses at terminal 12. If such absence of pulses at terminal 12 were to cause the permanent saturation of transistor 39, transistors 46 and 53 would be blocked, which would result in decreasing the voltage applied to cathode 5 and thus increase the intensity of the cathode current. The risks of such a situation occurring, which would be dangerous for the tube, are eliminated by the wiring at diode 43 and resistor 42.

Although in the example measurement of the intensity of the cathode current is effected during the flyback of line and raster scanning, that condition is not indispensable. Indeed, it is sufficient in general to measure the intensity of the cathode current during sampling instants (periodic or random) during which the video signal is zero. This zero level for the video signal can be imposed in accordance with a pre-established program, e.g. by means of a microprocessor.

The device shown in FIG. 3 includes a familiar type of video amplifier 60, featuring an input terminal 61 for the video voltage signal and a low impedance output terminal 62 for this same, increased, signal. It comprises also a control or feedback input 63. Amplifier 60 is such that, as a constant level signal is applied at input 63, there appears at output 62 a continuous voltage of determined value, that is superimposed on the amplified video signal, which is a function of the value of the signal applied at input 63. As will be shown below, control or feedback input 63 is connected to the output of a circuit producing a signal that is representative of the intensity of the cathode current during scanning flyback.

Output 62 is connected to a cathode 64 of the corresponding electron gun by means of the input stage of a current amplifier 65 that presents a high impedance between its output terminals 68 and 69. In other words, amplifier 65 appears at its output as a current generator.

This current amplifier 65 is a four terminal network which also presents two input terminals 66 and 67 connected, respectively, to the output terminal of amplifier 60 and to cathode 64. Output terminals 68 and 69 are connected, respectively, to terminal 66 and to a first input terminal of a memory storage device 70. The device is a four terminal network whose input terminals are, on the one hand, terminal 61 and, on the other hand, ground. This four terminal network features a first output terminal 72 which is connected directly to control input 63 of video amplifier 60. The second output terminal of four terminal network 70 is ground.

Terminal 69 of amplifier 65 is also connected to a first output terminal 73 of an interruptor device 74. The other output terminal of this interruptor device is ground. This interruptor also constitutes a four terminal network at input terminal 75 to which are applied voltage pulses 76 produced by a generator (not shown) comprising devices that are standard parts of a television receiver. These pulses 76 are synchronous with back or forth line scanning. The second input terminal of four terminal network 74 is the ground.

Operation of the device shown in FIG. 3 is the following:

Whatever the state of interruptor 74, the voltage signal occurring at output 62 of video amplifier 60 is transmitted to cathode 64 by means of the input stage of amplifier 65. The cathode current flows through the following circuit: cathode 64, input 67, input stage of amplifier 65, input 66, low impedance terminal 62 of amplifier 60 and ground.

During direct line scanning, interruptor 74 is closed and no signal is applied to the inputs of memory device 70 inasmuch as its inputs are thus short-circuited.

In this case, the current put out by amplifier 65 has the following route: terminal 69, interruptor 74, ground, output terminal 62 of amplifier 60, output terminal 68 of amplifier 65.

During line and raster scanning flyback, interruptor 74 is open (position shown in FIG. 3).

Output terminal 69 of amplifier 65 puts out a current signal that represents an amplification of the cathode current. This signal takes the following route: terminal 69, terminal 71, ground, terminal 62 of amplifier 60 and terminal 68 of amplifier 65.

Memory device 70 is thus fed only when the video signal is zero. By contrast, its output 72 applies a permanent signal at control input 63 of the video amplifier.

The current signal applied at input 71 of the device is transformed to a voltage therein, stored in memory, then reconverted into current so as to be applied at input 63 of amplifier 60.

When the current applied at input 63 is equal to zero, there occurs at output 62 a continuous voltage of constant value $V_{ext}$ that is added to the video voltage signal. If the intensity of the cathode current is not equal to zero during scanning flyback, the intensity of the current applied at input 63 is not equal to zero either and the result is that the continuous voltage at terminal 62 has a value greater than $V_{ext}$. Since this is a potential applied to the cathode, its increase brings about a decrease in the intensity of the cathode current. The desired control effect is thus actually achieved, i.e. any increase in the intensity of the cathode current during scanning flyback is compensated by a variation in continuous voltage which is superimposed on the video voltage signal to bring the value of this continuous voltage back to that of the extinction voltage.

In the diagram of FIG. 4, the elements of identical nature, i.e. those fulfilling the same function as those in FIG. 3, have been labeled with the same reference numbers.

Amplifier 60 is of the active load type. It comprises a transistor 80 of the N-P-N type whose base is connected to input terminal 61 by means of a resistor 81 and to ground by means of resistor 82. The base of transistor 80 is connected directly to control terminal 63. The collector of transistor 80 is connected to a line 83 brought to a positive potential, 230 volts in this example, by means of a high value resistor 84. The emitter of transistor 80 is connected to the cathode of a Zener diode 85 whose anode is grounded.

Transistor 80 is wired as common emitter; such wiring presents a high output impedance. It is in order to reduce this impedance that the amplifier is supplemented by an "emitter follower" circuit that comprises a transistor 86, also of the N-P-N type, whose base is connected to the collector of transistor 80 while its emitter is connected to terminal 62 and its collector to line 83 by means of a resistor 87.

Amplifier 60, finally, comprises a feedback resistor 88 between terminals 62 and 63 as well as a diode 89 between terminal 62 and the collector of transistor 80. The anode of this diode is connected to terminal 62.

Amplifier 65 comprises a transistor 90, of the P-N-P type, whose base is connected directly to terminal 66 and its emitter to cathode 64 by means of a resistor 91. The terminal of resistor 91 which is connected directly to cathode 64 is also connected to the base of transistor 90 by means of a capacitor 92. The collector of transistor 90 is connected to output terminal 69 by means of a resistor 93.

Transistor 90 is wired as "common base." Its current gain is practically equal to one. The emitter base impedance is low while the base collector impedance is of high value.

Resistor 91 and capacitor 92 constitute a low pass filter making it possible to short-circuit positive transients.

Memory device 70 comprises a transistor 94 of the N-P-N type having a base connected directly to terminal 71 and a collector connected to a line 95 raised to a positive potential of 24 volts by means of resistor 94a. The emitter of transistor 94 is grounded by means of a capacitor 96 and connected to the base of another transistor, 97, also of the N-P-N type. The emitter of transistor 97 is grounded, while its collector is connected to output terminal 72 by means of a resistor 98. A second capacitor, 99, is provided between the collector of transistor 97 and ground.

Interruptor 74 comprises a transistor 100 of the N-P-N type whose collector is connected to terminal 71 and whose base is connected to ground by means of a capacitor 101 and to line 95 through a resistor 102.

The emitter of transistor 100 is connected to terminal 75.

Input 75 of interruptor 74 is connected to output 75a of a device 110, receiving at its input the pulses produced by a generator that is part of the standard equipment of a television receiver. In the case of a color TV receiver, device 110 is common to the three devices generating the blanking voltage.

Output 75a of this device is grounded by means of the emitter and collector of P-N-P type transistor 103 whose emitter is also grounded by means of a resistor 104. This emitter is connected to line 95 by means of a resistor 105.

Pulses 76 are applied at the base of transistor 103 by means of a capacitor 105 in series with a resistor 106. The terminal common to capacitor 105 and resistor 106 is connected to the anode of a diode 107 whose cathode is connected to line 95 by means of a resistor 108. This cathode of diode 107 is also grounded by means of a capacitor 109. A resistor 109a is in parallel with capacitor 109.

The operation of the device shown in FIG. 4 is the same as that of the device represented in FIG. 3. However, the following points should be noted.

Diode 107 and capacitor 109 make it possible to block transistor 100 in the permanent absence of pulses 76. If such an absence were to cause the permanent saturation of transistors 100 and 103, transistors 94 and 97 would be blocked, which would bring about a lowering of the voltage applied to cathode 64 and, thus, an increase in the intensity of the cathode current. There would then be danger of damage to the tube.

Such a situation cannot occur. Indeed, in the absence of pulses, transistor 103 is blocked by the charge of capacitor 109.

The polarity and amplitude of pulses 76 are such that they make it possible to block transistor 103. These pulses are generated during line scanning flyback, i.e., during sampling periods.

During the forward line scanning (between two pulses 76), transistor 103 is saturated and consequently switch 74 is closed. Transistor 100 is also saturated, its emitter being then grounded. The intensity of the basic current of this last transistor is a function of the value of resistor 102, which determines the charge taken by capacitor 101.

When a pulse 76 occurs, during line scanning flyback, the potential at the base of transistor 100 is not modified and is maintained at the value imposed by the charge of capacitor 101 (accumulated during saturation periods for transistor 100) while the potential of its emitter takes on a value on the order of 1 volt, determined by the values of resistors 104 and 105a which form a voltage divider. Under these conditions, transistor 100 is blocked and switch 74 is consequently open.

Transistor 94 of memory device 70 makes it possible to increase even more the current put out by amplifier 65, to convert it into voltage and to store it in memory in capacitor 96. Transistor 97 and capacitor 99 have functions that are similar to those of transistor 94 and capacitor 96, respectively.

It will be appreciated that the device represented in FIG. 4 is of simple design, requiring only a small number of transistors to which high voltage is applied. In particular, transistor 100 of the interruptor device is polarized at a relatively low voltage. This circuit, for the most part, can be designed in integrated form.

In addition, its operation is satisfactory inasmuch as stray parasitic capacitances, which arise in high impedance connections, are reduced.

The device in accordance with the invention can be used in all types of display devices using cathode ray tubes, such as television receivers. But it is particularly useful in the design of color TV receivers, especially those in which all the so-called "$G_1$" grids are raised to the same potential.

In addition, it offers the following advantages: the aging of tubes and the (unavoidable) spread of design parameters for the tubes and guns are automatically corrected or compensated. In the case of application to color TV receivers, the colors are stabilized instantly when the set is turned on. Finally, it is not necessary to adjust blanking voltages at the factory.

The preceding specification describes, by way of illustration and not of limitation, a preferred embodiment of the invention. Equivalent variations of the described embodiment will occur to those skilled in the art. Such variations, modifications, and equivalents are within the scope of the invention as recited with greater particularity in the following claims, when interpreted to obtain the benefits of all equivalents to which the invention is fairly entitled.

What is claimed is:

1. Apparatus for generation of a blanking voltage for a cathode ray tube usable for display of television signals and having an electron gun, including a cathode, comprising means sensitive to intensity of cathode current and sampling meand connected for enabling said means sensitive to intensity of cathode current at periods during which a video signal applied to said cathode is equal to zero, and control means for modifying said blanking voltage according to said intensity in such a manner as to blank the beam current when the video signal is equal to zero, characterized by:
   (a) a video voltage amplifier means for applying said video voltage and said blanking voltage signals to the cathode of said electron gun, said video voltage amplifier having an output and a control input, the control means comprising:
   (i) means for servo-control of said blanking voltage including a feedback loop between: (a) a connection joining the output of said video voltage amplifier to said cathode, and (b) said control input of said video voltage amplifier means,
   (ii) said feedback loop comprising a current amplifier means for increasing the cathode current,
   (iii) said current amplifier means having an input and an output and further having an output impedance that is high in relation to the output impedance of said video voltage amplifier means, the input circuit of said current amplifier means being connected to the connection joining said cathode to the output of said video voltage amplifier means; and (b) memory storage means having an input connected to the output of said current amplifier means, and an output connected to said control input of said video voltage amplifier means, to maintain a control signal at said control input between successive sampling periods.

2. Apparatus in accordance with claim 1, further comprising controlled interruptor means, connected to said current amplifier means, for inhibiting operation of said feedback loop upstream to said memory storage means, at times other than said sampling periods.

3. Apparatus in accordance with claim 2 wherein said interruptor means is connected in short-circuiting relationship to the input of the current amplifier to short-circuit the latter at times other than said sampling periods.

4. Apparatus in accordance with claim 3, further comprising generating means for controlling said interruptor means, said generating means generated current pulses during said sampling periods or during complementary periods, said generating means having an output impedance high in relation to the output impedance of said video voltage amplifier means, and circuit means providing a circuit path for said current pulses and including the output of the video voltage amplifier means.

5. Apparatus in accordance with claim 4, further comprising control signal generating means for opening said interruptor means in case of abnormal operating conditions of said means for generating current pulses, including a condition of permanent absence of such pulses.

6. Apparatus in accordance with claims 4 or 5, wherein said means for generating current pulses comprises converting means for converting voltage pulses, generated during the sampling periods or the complementary periods, into current pulses.

7. Apparatus in accordance with claim 1 wherein said video voltage amplifier means is of the active load type.

8. Apparatus in accordance with claim 2 wherein said interruptor means is connected in short-circuiting relationship to said memory storage means for short-circuiting said memory storage means at times other than said sampling periods.

9. Apparatus in accordance with claim 8 wherein said interruptor means is connected between: (i) a connection joining the output of said current amplifier means to said memory storage means, and (ii) a point of constant potential.

10. Apparatus in accordance with claims 8 or 9, wherein said cathode ray tube comprises three electron guns for display of color images, each one of said electron guns corresponding to a separate one of said control means and connected thereto; and Further comprising means common to the three control means for generation of voltage pulses during sampling periods or during complementary periods, and for controlling said interruptor means thereby.

11. Apparatus in accordance with claim 10 wherein said means common comprises, in common to the three control means, means for the generation of a control signal for opening said interruptor means in case of abnormal operating conditions of the means for the generation of voltage signals, including a condition of permanent absence of such pulses.

12. Apparatus in accordance with claim 1, further including television receiver means connected to said cathode ray tube.

13. Apparatus in accordance with claim 12 wherein said cathode ray tube includes three electron guns for color display of television signals on a single cathode ray tube face, each of said three electron guns connected to a separate control means for modifying the blanking voltage thereof according to the intensity of cathode current thereof.

* * * * *